United States Patent Office 3,755,431
Patented Aug. 28, 1973

3,755,431
CYCLOPENTANE-TETRACARBOXYLIC ACID
Roland Guillemont, Bourg-La-Reine, France, assignor to Pechiney-Saint-Gobain, Neuilly-sur-Seine, France
No Drawing. Filed Dec. 1, 1970, Ser. No. 94,206
Claims priority, application France, Dec. 3, 1969, 6941684
Int. Cl. C07c 51/32, 61/06
U.S. Cl. 260—514 K                    4 Claims

ABSTRACT OF THE DISCLOSURE

This invention is addressed to a novel isomer of cyclopentane-tetracarboxylic acid having a melting point of about 160° C., and a tetramethyl ester thereof, which is prepared by subjecting 3,6-methylene 1,2,3,6-tetrahydrophthalic anhydride to a nitric acid oxidation reaction, and which can be used in the preparation of improved alkyd resins.

---

This invention relates to a novel isomer of cyclopentane-tetracarboxylic acid and to a new process for the preparation of same in a pure state, and the invention also relates to the preparation of alkyd resins stable in aqueous solution and which are colorless and electrodepositable, for use in forming a non-porous, even film.

It is known that cyclopentane-tetracarboxylic acid may appear in the form of six isomers obtained generally in admixture each with the other. The 1 cis, 2 cis, 3 cis, 4 cis-cyclopentane-tetracarboxylic acid and its dianhydride melting at 215–216° C., however, have been prepared in a relatively pure state.

It is also known that these isomers can be used to prepare alkyd resins, some of which may be deposited on a metallic carrier or support by electrodeposition. Attempts have been made to render such resins soluble, but the solubility qualities of such resins represent a problem which has been partially solved in French Patent No. 1,521,387. One of the difficulties which remains is the low stability of such resins in aqueous solution. Another disadvantage of such resins is their coloration which prohibits the use of such resins in a light-colored coating.

The product of this invention is an isomer which previously could not have been isolated in a pure state, or even in a high ratio in a mixture, and thus the product of this invention makes it possible to prepare novel water-soluble resins which are stable in aqueous solutions and which have light coloration. It is accordingly one object of this invention to provide an isomer of cyclopentane-tetracarboxylic acid in the pure state having a melting point of about 160° C., and the tetramethyl ester thereof which has an infra-red absorption spectrum with quantity bands with wave lengths of 9.6, 9.75, 9.90, 10.37, 10.55, 11.20, 12.03 and 14.50 microns.

It is another object of this invention to provide a novel method for the preparation of the isomer described above. In accordance with the practice of this invention, the method comprises carrying out a nitric acid oxidation reaction of 3,6-methylene 1,2,3,6-tetrahydrophthalic anhydride (or 5-norbornene-2,3-dicarboxylic anhydride). The method is carried out in two steps in which the anhydride is first contacted with nitric acid in a concentration of 50 to 75% by weight, and preferably about 60% by weight, for 1 to 4 hours (and preferably for about 2 hours) at a temperature within the range of 40 to 80° C. (and preferably about 60° C.) with the molar ratio of acid to the anhydride being between 3 and 10, and then contacting the product with nitric acid having a concentration within the range of 2 to 10% by weight, and preferably about 5% by weight, for 10 to 30 hours, and preferably about 20 hours, at a temperature of about 95° C., i.e., between 90° C. and 98° C.

It is yet another object of this invention is to provide an alkyd resin derived from the cyclopentane-tetracarboxylic acid isomer described above in which the isomer is added to an already esterified and condensed alkyd resin containing free hydroxyl groups.

The isomer of the tetracarboxylic acid of this invention appears in the form of white crystals melting at 160±2° C. On heating, the novel isomer of this invention yields a mono-anhydride melting at 220° C. Esterification of the acid for conversion to the tetramethyl ester is preferably carried out through the use of diazomethane whereby the tetramethyl ester can be more easily compared with corresponding esters of other isomers of cyclopentane-tetracarboxylic acid.

The infra-red absorption spectrum of the tetramethyl ester, the characteristic bands of which are set forth above, also serves to differentiate the ester from other products. Gas chromotography analysis of this isomer has demonstrated its purity, greater than 99%. Analysis of other tetramethyl esters of cyclopentane-tetracarboxylic acid has betrayed the presence of this isomer in other samples, but with a maximum proportion of only 7% by weight. The separation of this material could not be effected.

As indicated above, the process of this invention directly provides a highly concentrated product. Treble crystallization of the product of the process of this invention in water at a concentration of 60% by weight permits the separation of the novel cyclopentane-tetracarboxylic acid isomer of this invention in a purity of greater than 99% by weight.

A simple method which can be used for the preparation of 3,6-methylene 1,2,3,6-tetrahydrophthalic anhydride, hereinafter called MTHPAA, containing a mixture of the exo- and endo-methylene isomers in proportions of 57% by weight and 43% by weight, respectively, is described hereinafter in Example 2.

It has been found that the proportion of nitric acid employed with the MTHPAA is relatively low, and that the absence of catalysts avoids contamination of the product contained.

The preparation of an alkyd resin from the isomer of this invention is also described hereinafter, as well as the application of the alkyd resin by electrodeposition. As is described herein, the use of mixtures of the isomer of this invention with other isomers causes progressive degradation of the qualities of the resin obtained when the proportion of such other isomers is increased.

For purposes of illustration of the practice of this invention, and not of limitation, there are given two examples for the preparation of cyclopentane-tetracarboxylic acid and of alkyd resins containing the acid. The first example, which is given for comparative purposes, describes the preparation of cyclopentane-tetracarboxylic acid according to a conventional process. In the second example, description is made of the preparation of the MTHPAA starting material and the novel isomer according to the process of this invention.

EXAMPLE 1

Prior art process

There are progressively added 1500 g. of 3,6-endomethylene 1,2,3,6-tetrahydrophthalic anhydride into 7700 g. of nitric acid in a concentration of 60% by weight. The temperature of the reaction mixture is maintained at 60° C. for 10 hours. After cooling at room temperature, 40% of the cyclopentane-tetracarboxylic acid is separated directly by filtration. The filtrate is reconcentrated twice under reduced pressure until abundant crystallizaton occurs, thus yielding a total of 1,050 g. of cyclopentane-tetracarboxylic acid.

This acid is purified by successive recrystallizations in water at concentrations of 60% by weight of the acid based on the weight of solutions, and then dried. Analysis reveals the physical and chemical properties of the 1 cis, 2 cis, 3 cis, 4 cis acid, and particularly the formation of the dianhydride melting at about 215° C.

64.8 g. of this acid are introduced into the alkyl resin prepared as described hereinafter at a temperature of 140° C. The resulting mixture is then heated for 2 hours and the temperature progressively rises to 150° C. After the addition of 7% by weight of triethyl amine (based on the total amount of the resin, the mixture is diluted in water to obtain a solution of 60% by weight of the resin.

The resin, to which the cyclopentane-tetracarboxylic acid is added as described above, is prepared in the following manner: A mixture containing 32.4 g. of dehydrated fatty acid of ricinus, 94.6 g. of tetrapropenyl-succinic anhydride 36.4 g. of hexanol, 169.2 g. of trimethylolpropane and 119.2 g. of phthalic anhydride is heated to 195° C., and maintained at this temperature for 7 hours.

It is found that the solution containing 60% by weight of the resin as described has a perceptible yellowish hue, and contains many non-dissolved particles.

A sample of the freshly prepared resin containing cyclopentane-tetracarboxylic acid prepared in the manner described above is mixed with titanium oxide pigment in a weight ratio of pigment to binder of 0.4, with the binder being the mixture of the resin and the acid. The resulting suspension is rediluted in water to obtain a mixture containing 15% by weight of the resin and pigment in aqueous solution. The aqueous solution is applied to a metallic surface which has been surface treated by phosphatizing by application of a potential of 150 volts in an electrodeposition bath for 4 minutes, and then baking the coated surface at 160° C. for 30 minutes to cause cross-linking. The film thus formed has a brown color, and exhibits surface defects with "pin-holes" at the rate of several tens per square centimeter.

EXAMPLE 2

Process of this invention

A sample of 3,6-methylene 1,2,3,6-tetrahydrophthalic anhydride is prepared by introducing 980 g. of maleic anhydride and 660 g. of dicyclopentadiene into a reactor at room temperature in an atmosphere of pure, dry nitrogen. Thereafter, the mixture is heated to 170° C., and this temperature is maintained for 1.25 hours until complete de-dimerization, which can be marked by observation of the temperature with the reaction becoming exothermic upon disappearance of the dimer.

The reaction mixture is then heated to 190° C. and is maintained at that temperature for 2 hours. The resulting product is distilled under a pressure of 10 mm. Hg at a temperature between 95 and 150° C. and then under 3 mm. Hg at 145 to 160° C. The product thus obtained in the second distillate phase contains 57% by weight of the exomethylene isomer and 43% by weight of the endomethylene isomer. The yield is 82% and non-reacted materials can be re-used.

1285 g. of the anhydride mixture thus prepared are introduced progressively into 3300 g. of 60% by weight nitric acid, and the resulting mixture is maintained at a temperature of 60° C. for 2 hours and then at 95° C. for 20 hours by adjusting periodically the concentration of nitric acid to 5%. After cooling to room temperature, the precipitate thus formed is filtered. The filtrate is then twice concentrated to cause abundant crystallization, the solids of which are separated by filtration. The product is then recrystallized in aqueous solution containing 60% by weight acid by heating the acid solution to a boil and then cooling to room temperature. After filtration and drying, there is obtained 450 g. of pure product melting at 160° C.±2° C.

64.8 g. of this product are incorporated into the alkyd resin prepared in accordance with the procedure described in Example 1, and the resulting composition used in accordance with Example 1 to coat a metallic surface by electrodeposition. The coating thus obtained is white, does not exhibit surface defects and is not altered during a residence time for more than 100 hours in a saline mist (5% by weight).

By way of further comparison with the film of Example 1, it is found that the film produced in accordance with the concepts of this invention is uniform, has a high gloss and provides improved flow of paint. The electrodeposition bath can be maintained for long periods of time (more than 2 months) under agitation without observed degradation.

I claim:

1. A method for the preparation of an isomer of cyclopentane-tetracarboxylic acid comprising contacting a mixture of about 57% by weight of the exo-isomer and about 43% by weight of the endo-isomer of 3,6-methylene-1,2,3,6-tetrahydrophthalic anhydride with nitric acid in a concentration within the range of 40 to 75% by weight at a temperature within the range of 40 to 80° C. for 1 to 4 hours with the mole ratio of acid to anhydride being within the range of 3–10, contacting the product with nitric acid in a concentration of 2 to 10% by weight for 10 to 30 hours at a temperature of 90 to 98° C., and separating the product.

2. A method as defined in claim 1 wherein the anhydride is contacted with 60% by weight nitric acid for about 2 hours at a temperature of about 60° C. and the product is contacted with about 5% by weight nitric acid for about 20 hours.

3. A method as defined in claim 1 wherein the anhydride is prepared by de-dimerizing dicyclopentadiene and reacting the product with maleic anhydride at a temperature of about 190° C.

4. A method as defined in claim 3 wherein the molar ratio of maleic anhydride to dicyclopentadiene is about 2:1.

References Cited

Alder et al., Liebigs Annual Chem. 611 7 (1958).

LORRAINE A. WEINBERGER, Primary Examiner

R. GERSTL, Assistant Examiner

U.S. Cl. X.R.

260—22 CQ